3,499,903
QUATERNARY AMMONIUM HALIDES AND
PROCESS FOR THE PREPARATION THEREOF
Francesco Minisci, Milan, and Remo Galli, Torricella
del Pizzo, Cremona, Italy, assignors to Montecatini
Edison S.p.A., Milan, Italy
No Drawing. Filed Nov. 14, 1966, Ser. No. 593,654
Claims priority, application Italy, Nov. 15, 1965,
25,271/65
Int. Cl. C07c 87/02, 87/30
U.S. Cl. 260—293                    7 Claims

ABSTRACT OF THE DISCLOSURE

Described are quaternary ammonium halides of the formula

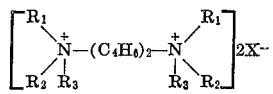

wherein $R_1$ and $R_2$ are alkyl of from 1 to 4 carbon atoms which when taken together may form a piperidino radical; $R_3$ is cetyl or benzyl; X is chlorine or bromine; the two units $C_4H_6$ are bound according to

—$CH_2$—CH=CH—$CH_2$—$CH_2$—CH=CH—$CH_2$— or according to

—$CH_2$—CH=CH—$CH_2$—$CH_2$—CH—CH=$CH_2$
                                       |

These compounds have a high disinfectant activity.

---

Our invention relates to quaternary ammonium halides and the preparation thereof.

More particularly, the object of our invention is a new class of quaternary ammonium salts having a high disinfectant activity and a process for the preparation thereof.

The quaternary ammonium salts of the present invention correspond to the formula:

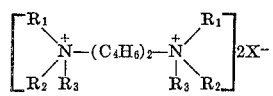  (1)

wherein $R_1$ and $R_2$ are alkyl of from $C_1$ to $C_4$; which when taken together may form a piperidino radical; $R_3$ is an alkyl from $C_1$ to $C_{20}$; X is Cl or Br; the two units of butadiene are prevailingly (75–90%) bound in the positions 1,4 and 1,4

—$CH_2$—CH=CH—$CH_2$—$CH_2$—CH=CH—$CH_2$— and in a minor amount (25–10%) in the positions 1,2 and 1,4

—$CH_2$—CH=CH—$CH_2$—$CH_2$—CH—CH=$CH_2$
                                       |

The products are prepared by reacting an N-chlorodialkylamine with butadiene-1,3 and ferrous sulphate, followed by the reaction of the thus obtained product with an alkyl halide. More specifically, the reaction is carried out at low temperature (−20+10° C.), in a solvent, preferably methanol, pouring the N-chlorodialkylamine into a solution containing one mole of ferrous sulphate and an excess of butadiene for each mole of N-chloroamine. The reaction proceeds rapidly and is exothermic, thus necessitating cooling. The butadiene excess is removed. The reaction products are then separated by alkalizing the residual solution. Byproduct 1-dialkylamino-4-chloro-2-butene is found. This is easily separated by distillation. The amine thus obtained is reacted with the alkyl halide by heating in solution the two products, using preferably an excess of alkyl halide. The latter can be recovered at the completion of the reaction by treating or extracting the mixture with a solvent, e.g. ether or a aliphatic, hydrocarbon (fraction $C_6$—$C_{10}$ from petroleum cracking), in which the quaternary ammonium salt is insoluble, but in which the alkyl halide is soluble.

The following examples are to illustrate but not to limit the present invention.

EXAMPLE 1

90 g. of butadiene-1,3 and 186 g. of ferrous sulphate heptahydrate are placed in 400 cc. of methanol. 40 g. of N-chloro-piperidino, dissolved in 60 cc. of methanol, under cooling (between −10 and 0° C.) and nitrogen atmosphere, are added under agitation within 30 minutes. The whole is diluted with water, the butadiene in excess is separated by distillation, after which the solution is extracted with ether. After evaporating off the solvent, the residue is distilled off under vacuum collecting up to 90°/0.7 mm. 4.4 g. of 1-piperidino-4-chloro-2-butene and 36 g. of non-chlorinated amines at 160–170°/0.7 mm.

(A) 13.8 g. of amines (B.P. 160–170° C./0.7 mm. Hg) and 35 g. of cetyl bromide in 100 cc. of ethyl alcohol were heated under reflux for 8 hours. The alcohol in excess was removed by distillation. The residue was extracted with diethylether leaving undissolved 39.4 g. of a mixture of quaternary ammonium salts which are directly usable and have the formula

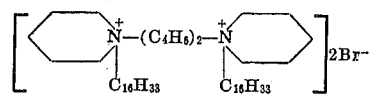

of which 89% consists of the linear isomer and 11% of the branched isomer. Linear isomer was the 2,6-octadiene-1,8 bis (N-cetyl-piperidino)-bromide, and the branched isomer was the 1-vinyl-4-hexene-1,6-bis (N-cetyl-piperidino)-bromide.

(B) 13.8 g. of amines (B.P. 160–170° C./0.7 mm.) and 24 g. of benzyl chloride in 100 cc. of ethyl alcohol were heated under reflux for 10 hours. The alcohol was distilled off and the residue was extracted with ether leaving as a residue 21.4 g. of quaternary ammonium salts of the formula:

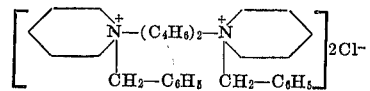

89% of which is the linear isomer and 11% is the branched isomer.

EXAMPLE 2

We proceeded as in Example 1, starting from 27 g. of N-chlorodiethylamine in 60 cc. of methanol, 80 g. of butadiene and 150 g. of ferrous sulphate heptahydrate in 400 cc. of methanol. 24 g. of product were obtained, which distilled at 125–135° C./1.5 mm. This product was treated as in Example 1 with cetyl bromide and benzyl chloride respectively, thus obtaining mixtures of quaternary ammonium salts respectively of the structures:

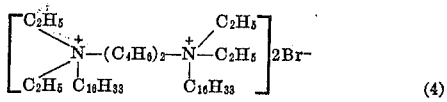  (4)

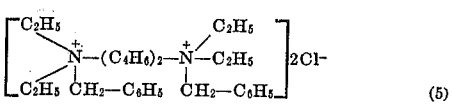  (5)

74.5% was the linear isomer and 25.5% was the branched isomer in both cases.

EXAMPLE 3

The operation was carried out as in the preceding examples, starting from 80 g. of butadiene, 86 g. of ferrous sulphate heptahydrate in 300 cc. of methanol and 46 g. of N-chloro-dibutylamine in 100 cc. of methanol. 36 g. of product boiling at 190–210° C./1.5 mm. Hg were obtained. The quaternary ammonium salts obtained with cetyl bromide and benzyl chloride respectively have the structures:

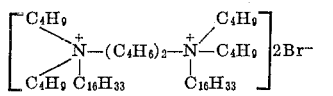

(6)

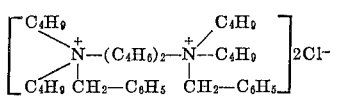

(7)

and contain 76% of the linear isomer and 24% of the branched isomer.

We claim:
1. Quaternary ammonium halides of the formula

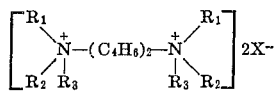

wherein $R_1$ and $R_2$ are alkyl of 1 to 4 carbon atoms which when taken together form a piperidino radical, $R_3$ is cetyl or benzyl, X is chlorine or bromine, the two units $C_4H_6$ are bound according to

—CH$_2$—CH=CH—CH$_2$—CH$_2$—CH=CH—CH$_2$— or according to

—CH$_2$—CH=CH—CH$_2$—CH$_2$—CH—CH=CH$_2$

2. The quaternary ammonium halide of claim 1 which is

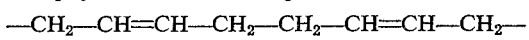

3. The quaternary ammonium halide of claim 1 which is

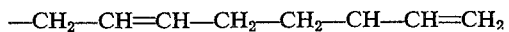

4. The quaternary ammonium halide of claim 1 which is

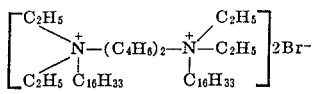

5. The quaternary ammonium halide of claim 1 which is

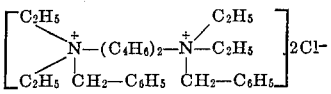

6. The quaternary ammonium halide of claim 1 which is

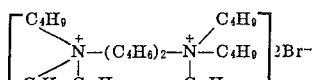

7. The quaternary ammonium halide of claim 1 which is

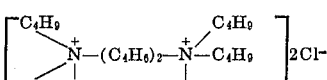

References Cited

UNITED STATES PATENTS

| | | | |
|---|---|---|---|
| 3,017,435 | 1/1962 | Coffman et al. | 260—583 |
| 3,062,886 | 11/1962 | Pritchett et al. | 260—583 |
| 3,062,888 | 11/1962 | Lecher et al. | 260—583 |
| 3,156,729 | 11/1964 | Mador et al. | 260—583 |
| 3,205,154 | 9/1965 | Mador et al. | 260—583 X |

OTHER REFERENCES

Wagner et al., Synthetic Organic Chemistry, p. 668 (1963).

Minisci et al., La Chimica E L'Industria, vol. 47, No. 7, pp. 736–743 (1965).

BERNARD HELFIN, Primary Examiner

G. A. SCHWARTZ, Assistant Examiner

U.S. Cl. X.R.

106—15; 260—567.6, 999